(12) United States Patent
Hayashi

(10) Patent No.: US 9,537,529 B2
(45) Date of Patent: Jan. 3, 2017

(54) COMMUNICATION APPARATUS

(71) Applicant: SONY CORPORATION, Tokyo (JP)

(72) Inventor: Tetsuya Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 35 days.

(21) Appl. No.: 14/496,229

(22) Filed: Sep. 25, 2014

(65) Prior Publication Data

US 2015/0099460 A1  Apr. 9, 2015

(30) Foreign Application Priority Data

Oct. 4, 2013  (JP) ................. 2013-209479

(51) Int. Cl.
*H04M 1/00* (2006.01)
*H04B 1/40* (2015.01)
*H04B 1/08* (2006.01)

(52) U.S. Cl.
CPC ............... *H04B 1/40* (2013.01); *H04B 1/086* (2013.01)

(58) Field of Classification Search
CPC ........ H04M 1/6066; H04M 1/385; H04B 1/05
USPC ............................................. 455/575.2, 41.2
See application file for complete search history.

(56) References Cited

U.S. PATENT DOCUMENTS

| | | | | |
|---|---|---|---|---|
| 5,844,824 A * | 12/1998 | Newman | ................. | G06F 3/011 345/156 |
| 6,017,049 A * | 1/2000 | Spector | ................. | A42B 3/0433 2/425 |
| 6,547,456 B2 * | 4/2003 | Wechsler | ................. | G06Q 30/02 348/157 |
| 8,543,061 B2 * | 9/2013 | Suhami | ................. | G10K 11/1786 381/313 |
| 8,665,177 B2 * | 3/2014 | Herrmann | ................. | G02B 27/017 345/8 |
| 8,670,000 B2 * | 3/2014 | Braun | ................. | G09G 3/002 345/617 |
| 8,767,306 B1 * | 7/2014 | Miao | ................. | G02B 27/0172 359/629 |
| 9,096,920 B1 * | 8/2015 | Gomez | ................. | C23C 4/06 |
| 2010/0245585 A1 * | 9/2010 | Fisher | ................. | H04M 1/6066 348/164 |
| 2011/0010607 A1 * | 1/2011 | Raveendran | ................. | H04L 1/0067 714/776 |
| 2011/0043644 A1 * | 2/2011 | Munger | ................. | G02B 27/017 348/207.1 |
| 2013/0278635 A1 * | 10/2013 | Maggiore | ................. | G06T 19/006 345/633 |
| 2014/0085190 A1 * | 3/2014 | Erinjippurath | ................. | G02B 27/0172 345/156 |

FOREIGN PATENT DOCUMENTS

JP  2011-117660 A  6/2011
JP  2011-254523 A  12/2011

* cited by examiner

*Primary Examiner* — April G Gonzales
(74) *Attorney, Agent, or Firm* — Chip Law Group

(57) ABSTRACT

There is provided a communication apparatus including an antenna unit configured to transmit or receive a wireless signal, and a wireless processing unit configured to process the wireless signal transmitted or received via the antenna unit. The antenna unit is configured or arranged to maintain a satisfactory communication characteristic regardless of arrangement and a direction with respect to an antenna of a communication partner apparatus that transmits or receives a wireless signal of high directivity.

20 Claims, 17 Drawing Sheets

100 COMMUNICATION SYSTEM

COMMUNICATION APPARATUS

CROSS REFERENCE TO RELATED APPLICATIONS

This application claims the benefit of Japanese Priority Patent Application JP 2013-209479 filed Oct. 4, 2013, the entire contents of which are incorporated herein by reference.

BACKGROUND

The present technology disclosed herein relates, for example, to a communication apparatus that transmits or receives a wireless signal carrying large capacity data such as images of high resolution. The present technology relates in particular to a communication apparatus that transmits or receives a high frequency wireless signal of high directivity.

High Definition Multimedia Interface (HDMI) (registered trademark) cables are, for example, used in order to send signals for images of high resolution that are reproduced and output from reproduction apparatuses such as Blu-ray disc players, to display apparatuses such as television sets. HDMI (registered trademark) is an interface standard for digital images and audio input and output, which has been primarily developed for home appliances and AV apparatuses, and allows digital data to be sent at high speed.

Fewer cables are used today because of wireless connections established between reproduction apparatuses and display apparatuses. For example, WirelessHD (registered trademark) uses a millimeter wave frequency band of 60 GHz to achieve a sending speed of some GMbps. Accordingly, even if signals for images of high resolution which are not compressed are streamed, the images of high quality can be reproduced and it is also possible to make HDMI (registered trademark) wireless.

Millimeter waves are shorter in wavelength and travel much more straightly than microwaves, which are in widespread use in the technology of wireless local area networks (LAN). Reflection attenuates millimeter waves hard and brings considerable propagation loss, so that wireless signals have a short flying distance and fail to get to distant places. Accordingly, when wireless communication is established in accordance with the WirelessHD (registered trademark) standard, the flying distance has to be extended by applying a communication method such as the array antenna technology to at least one of transmission apparatuses and reception apparatuses, the array antenna technology taking advantage of the directivity of antennas. As a result, the arrangement and direction of transmission apparatuses and reception apparatuses are so limited that the transmission apparatuses and the reception apparatuses each face in the directivity direction in which the maximal gain is obtained while wireless signals are sent.

For example, such a communication method has been devised in which one of two communication apparatuses that have established wireless communication in accordance with the WirelessHD (registered trademark) standard outputs electronics sounds according to the wireless reception states and users check the electronic sounds to make the antenna unit of each communication apparatus face in the directivity directions in which the maximal gain is obtained while wireless signals are sent (see, for example, JP 2011-254523A).

A projector has been devised that includes a WirelessHD reception apparatus that wirelessly receives image information, a monitoring unit that monitors the reception sensitivity, and a driving unit that changes the direction of the WirelessHD reception apparatus, the projector changing the direction of the WirelessHD reception apparatus on the basis of the reception sensitivity (see, for example, JP 2011-117660A).

When stationary image display apparatuses such as television sets and projectors are used as reception apparatuses, the reception apparatuses are rarely moved while they are in use (i.e., while reproducing images). Thus, the reception apparatuses can stably keep receiving wireless signals of high directivity from transmission apparatuses if the arrangement and directions of the reception apparatuses which offer satisfactory reception characteristics are decided only once when the reception apparatuses start to be used.

SUMMARY

According to an embodiment of the present disclosure, there is provided an excellent communication apparatus that can preferably transmit or receive a wireless signal of high directivity in a millimeter wave band, for example.

According to another embodiment of the present disclosure, there is provided an excellent communication apparatus that can preferably transmit or receive a wireless signal of high directivity while maintaining stable communication characteristics even when the arrangement and direction of the communication apparatus with respect to a communication partner apparatus are not stable.

According to an embodiment of the present disclosure, there is provided a communication apparatus including an antenna unit configured to transmit or receive a wireless signal, and a wireless processing unit configured to process the wireless signal transmitted or received via the antenna unit. The antenna unit is configured or arranged to maintain a satisfactory communication characteristic regardless of arrangement and a direction with respect to an antenna of a communication partner apparatus that transmits or receives a wireless signal of high directivity.

According to another embodiment of the present disclosure, the antenna unit of the communication apparatus may transmit or may receive a wireless signal in a millimeter wave band.

According to still another embodiment of the present disclosure, the antenna unit of the communication apparatus may transmit or may receive a wireless signal complying with a WirelessHD (registered trademark) standard.

According to yet another embodiment of the present disclosure, the communication apparatus according may further include a housing configured to accommodate a circuit component in the communication apparatus including the antenna unit and the wireless processing unit. The antenna unit may maintain a satisfactory communication characteristic with respect to a wireless signal regardless of arrangement and a direction of the housing.

Further, according to an embodiment of the present disclosure, the communication apparatus may be a reception apparatus that receives a wireless signal transmitted from a transmission apparatus. The communication apparatus may further include a transfer unit configured to transfer a signal that has been processed by the wireless processing unit to an external apparatus.

According to another embodiment of the present disclosure, the transfer unit of the communication apparatus may transfer a signal to the external apparatus via a cable.

According to still another embodiment of the present disclosure, the transmission apparatus may transmit data on a wireless signal, the data including an image. The external apparatus may be an output apparatus that outputs the data including an image. The communication apparatus may be configured to be externally attached to the output apparatus.

According to yet another embodiment of the present disclosure, the output apparatus may be a head mounted display that is worn by a user around a head. The communication apparatus may be configured as a battery unit for the head mounted display.

Still further, according to an embodiment of the present disclosure, the antenna unit of the communication apparatus may have a uniform communication characteristic in substantially all directions on a plane.

According to another embodiment of the present disclosure, the antenna unit of the communication apparatus may have a uniform communication characteristic in substantially all directions on a plane parallel with a particular surface of the housing.

According to still another embodiment of the present disclosure, the housing may be substantially cuboid. When the housing is horizontally placed with a largest surface down, the antenna unit may have a uniform communication characteristic in substantially all directions on a horizontal plane.

According to yet another embodiment of the present disclosure, the housing of the communication apparatus may have a visual mark attached to a communication surface on which the antenna unit has satisfactory communication sensitivity.

Yet further, according to an embodiment of the present disclosure, the antenna unit of the communication apparatus may include a plurality of polarized array antennas installed on an identical plane, the plurality of polarized array antennas having orthogonal polarization directions.

According to another embodiment of the present disclosure, the respective polarized array antennas of the communication apparatus may be configured as a conductor pattern on a wireless circuit substrate module including the wireless processing unit.

According to still another embodiment of the present disclosure, the respective polarized array antennas of the communication apparatus may be configured as a conductor pattern formed on a surface of a single circuit chip mounted on the wireless circuit substrate module.

According to yet another embodiment of the present disclosure, the communication apparatus may further include a shield/case configured to cover a surface of the wireless circuit substrate module.

Furthermore, according to an embodiment of the present disclosure, the shield/case of the communication apparatus may also function as a heat sink.

According to another embodiment of the present disclosure, the shield/case of the communication apparatus may have an opening above the antenna unit.

According to still another embodiment of the present disclosure, the communication apparatus may be a transmission apparatus that transmits a wireless signal carrying reproduction data reproduced from a recording medium.

According to one or more of embodiments of the present disclosure, there is provided an excellent communication apparatus that can preferably transmit or receive a wireless signal of high directivity in a millimeter wave band while maintaining stable reception characteristics even when the arrangement and direction of the communication apparatus with respect to a communication partner apparatus are not stable.

The advantageous effects described herein are merely illustrative. The advantageous effects of the present disclosure are not limited thereto. An additional advantageous effect may be attained in addition to the above-mentioned advantageous effects. Other features and advantages of the present technology disclosed herein will be clear from the detailed description based on the following embodiments and the attached drawings.

DETAILED DESCRIPTION OF THE EMBODIMENT(S)

Figure 1:
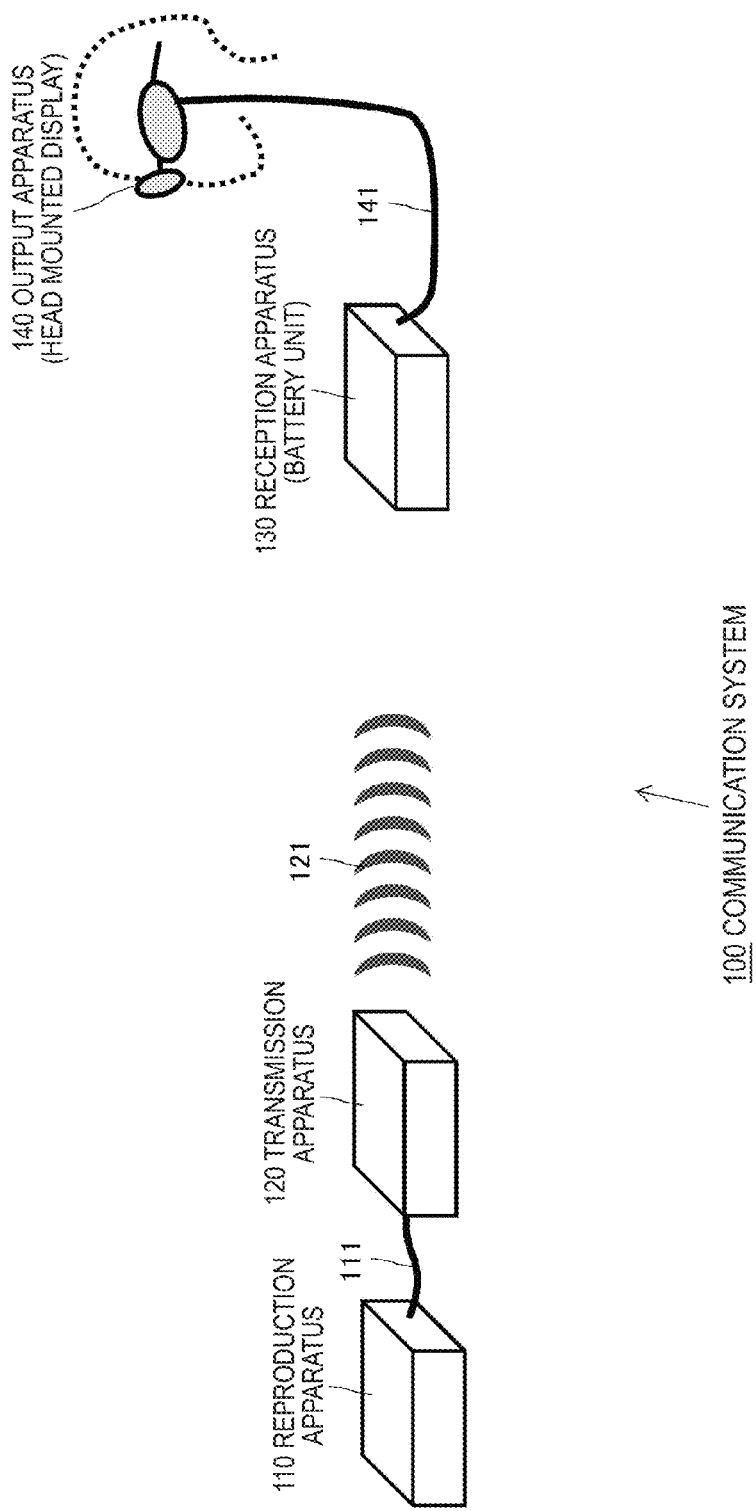
FIG. 1 schematically illustrates a configuration example of a communication system 100 using a directional wireless signal.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described below in detail with reference to the drawings.

FIG. 1 schematically illustrates a configuration example of a communication system 100 that uses a directional wireless signal. The illustrated communication system 100 includes a reproduction apparatus 110 that reproduces large capacity data such as moving images of high resolution from a medium such as Blu-ray discs, a transmission apparatus 120 that transmits, on a wireless signal 121, the reproduction data from the reproduction apparatus 110, a reception apparatus 130 that receives the wireless signal 121 from the transmission apparatus 120, and an output apparatus 140 that outputs the reproduction data by displaying screens of the received moving images or the like.

Cables 111 and 141 connect the reproduction apparatus 110 to the transmission apparatus 120, and the reception apparatus 130 to the output apparatus 140, respectively. Any technique for wired connections can be used. Needless to say, the reproduction apparatus 110 and the reception apparatus 130 may be wirelessly connected to the transmission apparatus 120 and the output apparatus 140 instead of wired connections, respectively.

The wireless signal 121 in a millimeter wave band or a high frequency band like WirelessHD (registered trademark) is, for example, used for the wireless communication between the transmission apparatus 120 and the reception apparatus 130. An antenna (not shown in FIG. 1) of the transmission apparatus 120 outputs the wireless signal 121 of high directivity in the frontal direction. Meanwhile, an antenna (not shown in FIG. 1) of the reception apparatus 130 is configured/arranged in the reception apparatus 130 such that satisfactory reception characteristics are maintained even if the arrangement and direction change a little with respect to the front of an antenna of the transmission apparatus 120. The details will be described below.

Examples of the output apparatus 140 include head mounted displays worn around the heads of users. The reception apparatus 130 is externally attached to the output apparatus 140. The reception apparatus 130 may function as, for example, a battery unit for a head mounted display. In that case, the cable 141 shall include a signal line for power supply.

If the output apparatus 140 is worn or carried by a user like a head mounted display, the reception apparatus 130 is pulled and easily moved by the cable 141 every time the user moves his or her body and changes his or her posture, changing the arrangement and direction with respect to the transmission apparatus 120. Thus, an antenna of the reception apparatus 130 has to be configured and arranged to stably keep receiving wireless signals of high directivity from the transmission apparatus 120 while the output apparatus 140 is in use.

Figure 16:
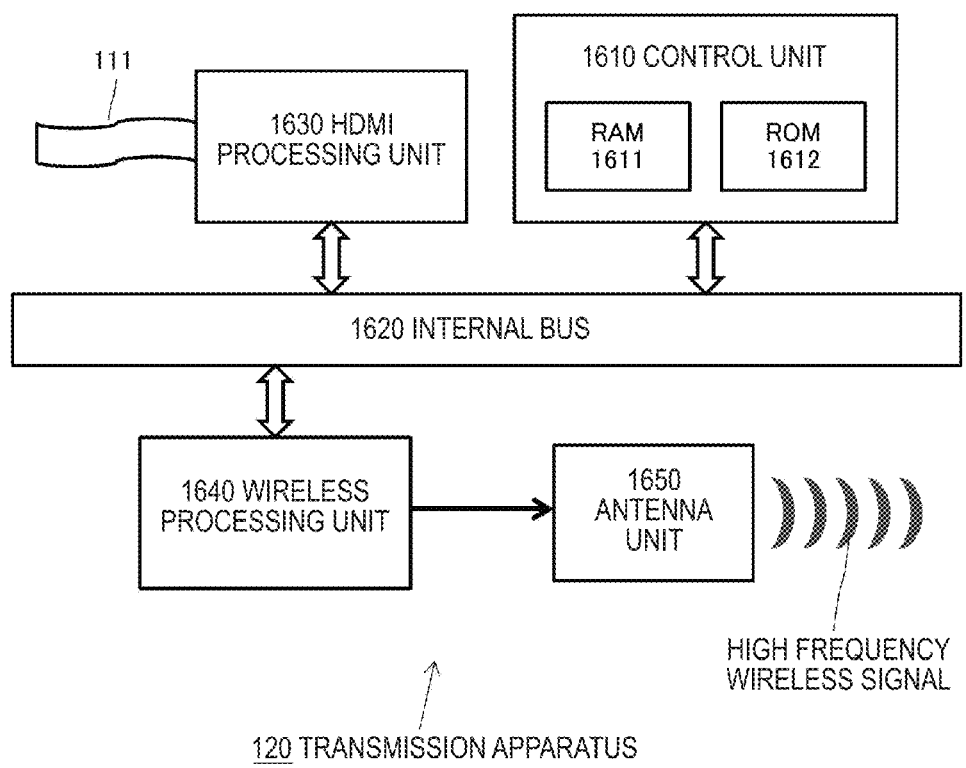
FIG. 16 schematically illustrates an internal configuration example of the transmission apparatus 120.

FIG. 16 illustrates an internal configuration example of the transmission apparatus 120. As discussed above, the transmission apparatus 120 transmits, on high frequency wireless signals, large capacity data such as moving images of high resolution reproduced by the reproduction apparatus 110 from a medium.

A control unit 1610 is interconnected to each unit via an internal bus 1620, and comprehensively controls the whole operation of the transmission apparatus 120. The control unit 1610 includes random access memory (RAM) 1611 and read only memory (ROM) 1612, loads a program code stored in the ROM 1612 onto the RAM 1611, and executes the processing as necessary.

HDMI (registered trademark) is, for example, used for a communication interface that interconnects the reproduction apparatus 110 to the transmission apparatus 120. An HDMI (registered trademark) processing unit 1630 performs interface processing on transfer data such as moving images of high resolution sent via an HDMI (registered trademark) cable 111.

A transmission signal that is transmitted to the reception apparatus 130 is modulated and encoded, subjected to DA conversion, up-converted into a signal in a high frequency wireless wave band, and subjected to power amplification by a wireless (RF) processing unit 1640, and then is emitted in the air from an antenna unit 1650. As discussed above, high frequency wireless signals have considerable propagation loss and a short flying distance. Accordingly, it is preferable to apply a transmission method such as the array antenna technology to the antenna unit 1650, the array antenna technology taking advantage of the directivity of antennas.

Figure 2:
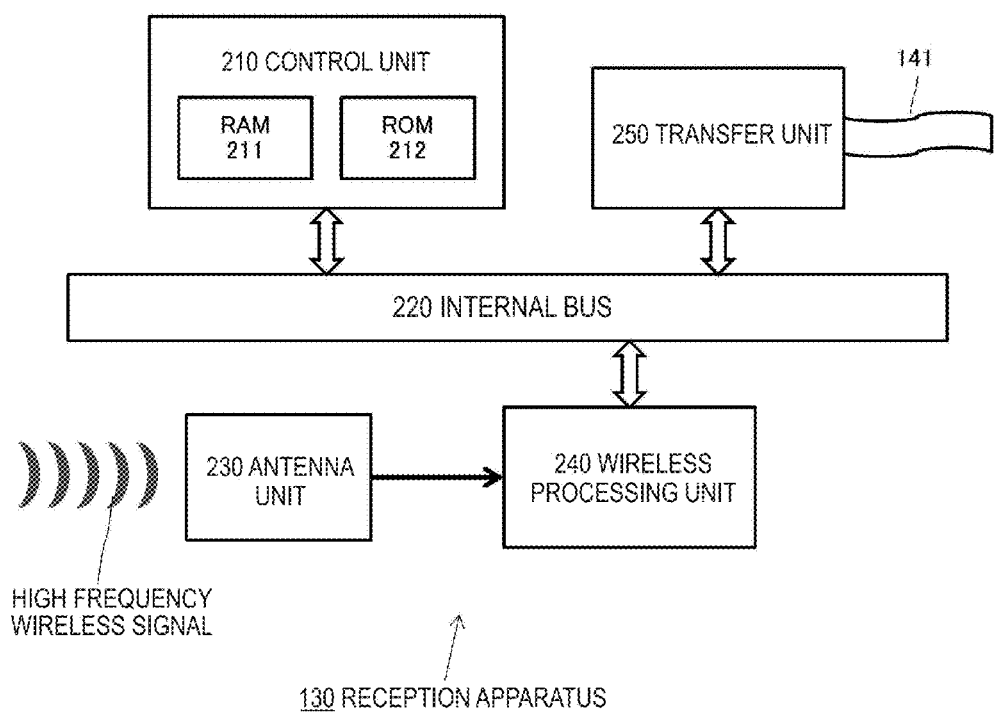
FIG. 2 schematically illustrates an internal configuration example of a reception apparatus 130.

FIG. 2 schematically illustrates an internal configuration example of the reception apparatus 130. As discussed above, the reception apparatus 130 also functions as an apparatus externally attached to a head mounted display such as battery units. The functional modules that are not directly related to processing of receiving wireless signals are not shown as appropriate.

A control unit 210 is interconnected to each unit via an internal bus 220, and comprehensively controls the whole operation of the reception apparatus 130. The control unit 210 includes random access memory (RAM) 211 and read only memory (ROM) 212, loads a program code stored in the ROM 212 onto the RAM 211, and executes the processing as necessary.

An antenna unit 230 receives a high frequency wireless signal coming from the transmission apparatus 120. The antenna unit 230 may be implemented as a wiring pattern on a wireless circuit module substrate (not shown in FIG. 2) having circuit chips mounted thereon, the circuit chips being included in a wireless processing unit 240 and the control unit 210. Alternatively, the antenna unit 230 may also be a conductor pattern formed on the surface of an RF circuit chip (not shown in FIG. 2) included in the wireless processing unit 240.

The wireless (RF) processing unit 240 performs processing such as low noise amplification, down-conversion, AD conversion, modulation, and encoding on a reception signal of the antenna unit 230.

A transfer unit 250 transfers the reception data processed by the wireless processing unit 240 to the output apparatus 140 via the cable 141 under the control of the control unit 210.

Once the output apparatus 140 is moved, the reception apparatus 130 is pulled and moved by the cable 141 and the arrangement and direction change with respect to the transmission apparatus 120. As discussed above, the antenna unit 230 has to be configured and arranged to maintain satisfactory reception characteristics even if the arrangement and direction change a little with respect to the front of an antenna of the transmission apparatus 120. The configuration and arrangement of the antenna unit 230 will be considered below.

The direction of an electric field radiated from an antenna is referred to as direction of polarized waves. Polarized waves are broadly categorized into linearly polarized waves and circularly polarized waves. Linearly polarized waves are subdivided into vertically polarized waves and horizontally polarized waves, depending on the direction of the polarized waves. Linearly polarized waves have a longer communication distance than circularly polarized waves if the transmission apparatus and the reception apparatus have the polarization directions match with each other. When a wireless signal in a high frequency band is used like WirelessHD (registered trademark), a flying distance has to be extended using the directivity of antennas through the array antenna technique or the like (as described above). Accordingly, it is assumed that a polarized array antenna (not shown) is used for the antenna unit 1650 of the transmission apparatus 120 in the present embodiment, the polarized array antenna having radiation characteristics of linearly polarized waves and the directivity in the frontal direction.

When only direct waves 301 radiated from an antenna of the transmission apparatus 120 in the frontal direction reach the antenna unit 230 of the reception apparatus 130 (see FIG. 3), the antenna unit 230 of the reception apparatus 130 includes a polarized array antenna, which has characteristics of linearly polarized waves, and the reception apparatus 130 may only be arranged to have the polarization direction match with the polarization direction of the antenna of the transmission apparatus 120 and have the front face the transmission apparatus 120.

Figure 4:
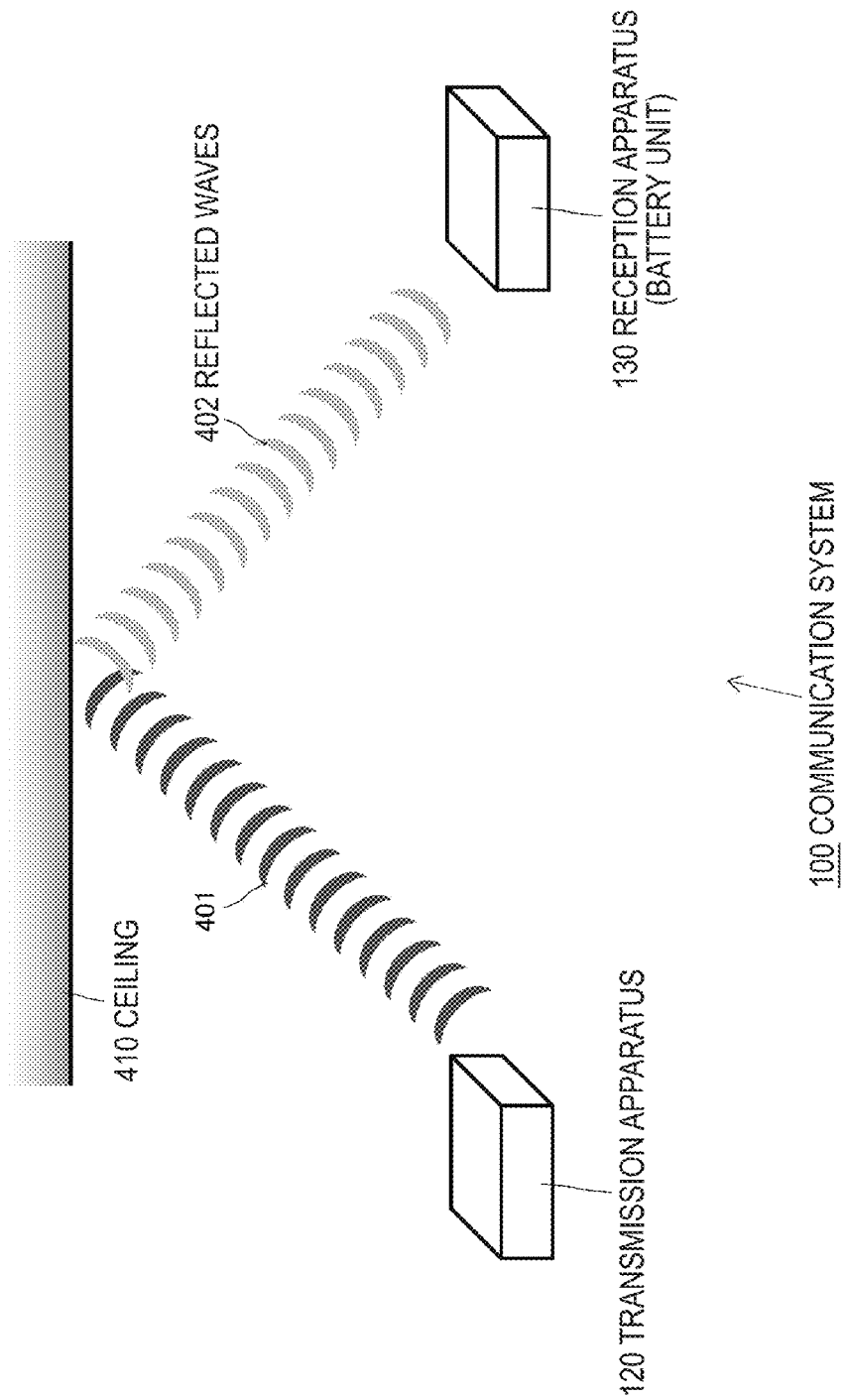
FIG. 4 shows that a reflected wave 402 of a wireless signal 401 radiated from the transmission apparatus 120 reaches the reception apparatus 130.
Figure 5:
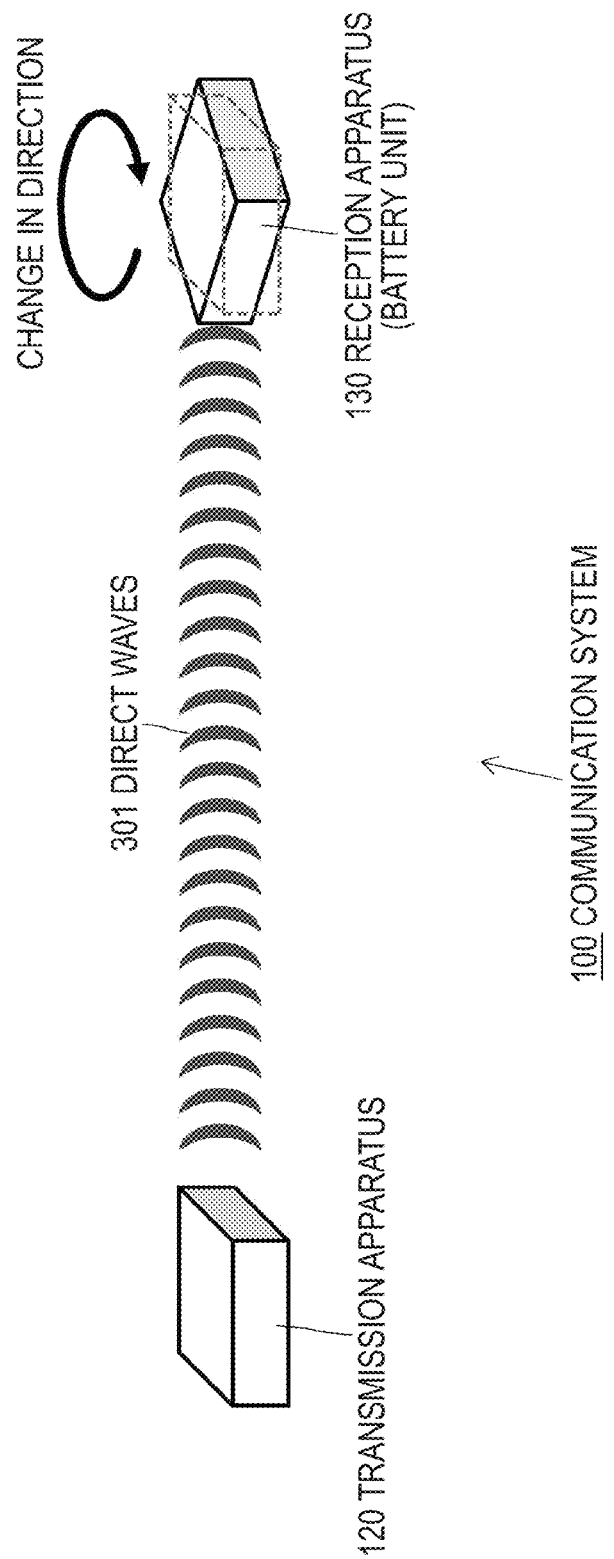
FIG. 5 shows that a direction of the reception apparatus 130 changes.
Figure 6:
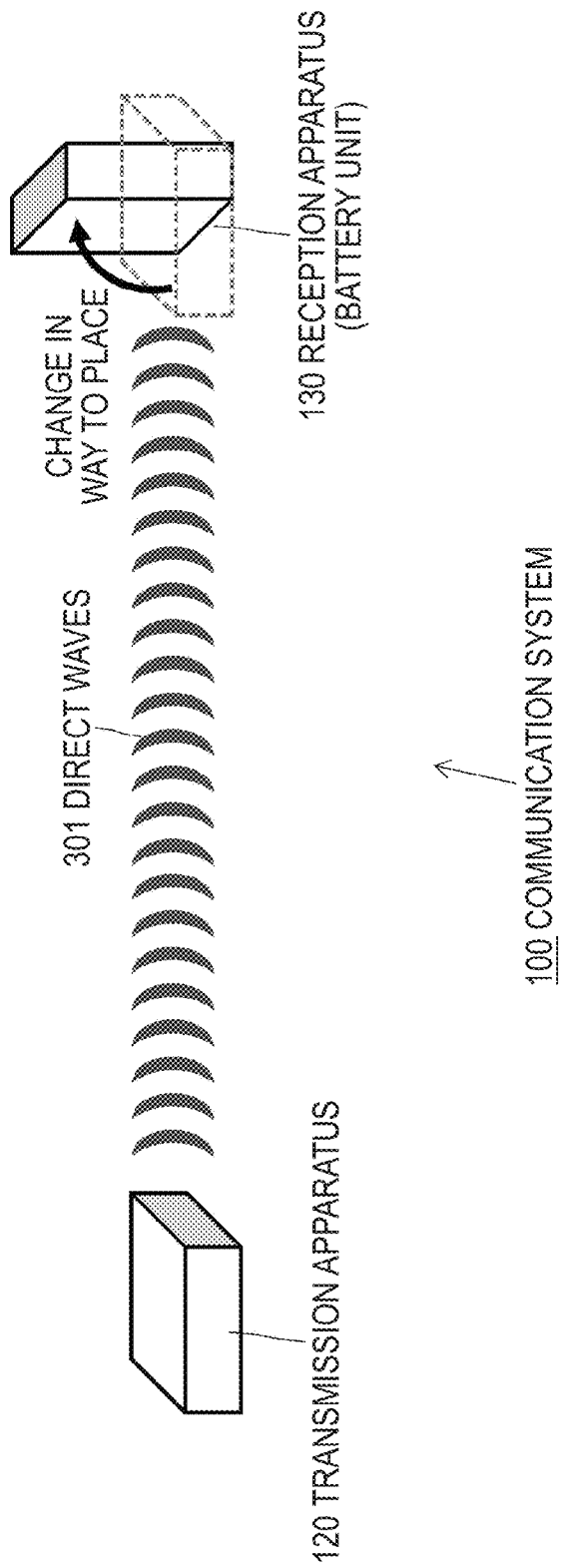
FIG. 6 shows that a way to place the reception apparatus 130 changes.

When the communication system 100 is used indoors, reflected waves 402 of radio waves 401 radiated from an antenna of the transmission apparatus 120 and reflected off a ceiling 401 and a wall reach the antenna unit 230 (see FIG. 4). Since the polarization plane and phase of a wireless signal having a polarization direction are disturbed by reflection, it is likely that the influence of the reflected waves 402 causes the reception apparatus 130 to fail to demodulate the reception signal. Additionally, if the cable 141 pulls the reception apparatus 130 and brings about a change in the direction of the reception apparatus 130 (see FIG. 5), or if a user changes the way to place the reception apparatus 130 (see FIG. 6), the antenna unit 230 including an antenna element that has linear polarization characteristics does not match with a wireless signal radiated from an antenna of the transmission apparatus 120 in polarization direction. Thus, it is likely that the reception sensitivity is diminished.

The antenna unit 230 of the reception apparatus 130 then includes an antenna having reception characteristics substantially uniform in all the directions on the plane in the present embodiment. For example, two polarized array antennas having the polarization directions orthogonal to each other are installed on the same plane to configure the antenna unit 230, so that the reception characteristics on the plane are substantially uniform in all the directions as a whole. Alternatively, while the antenna unit 230 of the reception apparatus 130 is configured to have the directional reception sensitivity, the antenna unit 1650 of the transmission apparatus 120 may be configured using an antenna having transmission characteristics substantially uniform in all the directions on the plane as illustrated in FIGS. 7 to 10 (discussed below). If both of the transmission apparatus 120 and the reception apparatus 130 have communication characteristics uniform in all the directions, the directions and installation angles of both are freely decided.

As discussed above, if the antenna unit 230 is configured as a wiring pattern on a wireless circuit module substrate or a conductor pattern formed on the surface of a circuit chip, a plurality of patterns of polarized array antennas having the orthogonal polarization directions is formed, so that the reception characteristics on the substrate or the surface of the circuit chip can be substantially uniform in all the directions.

Figure 7:
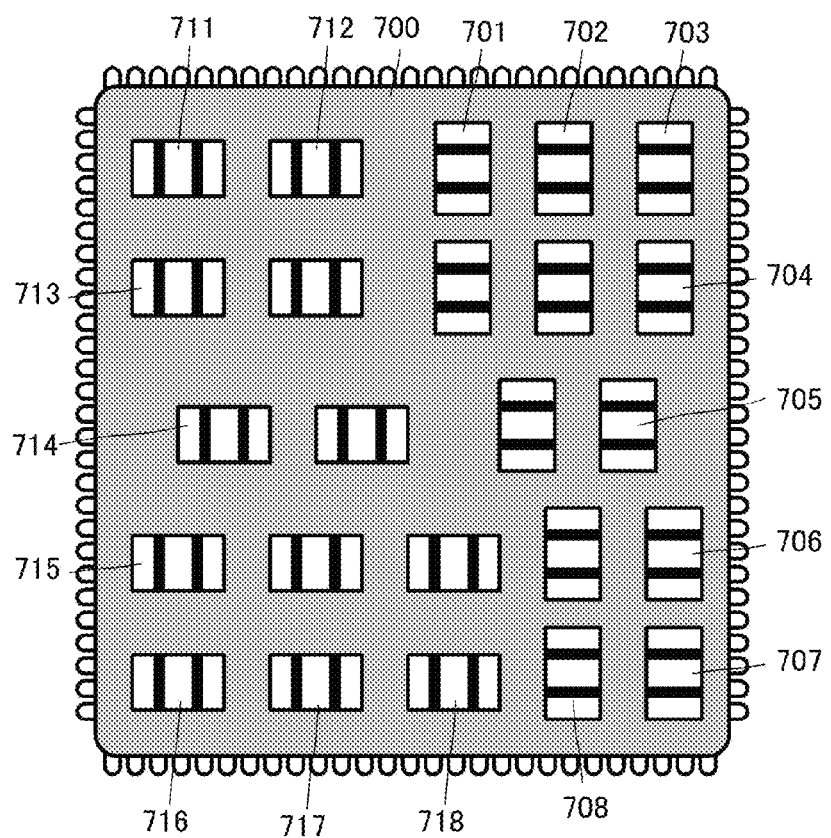
FIG. 7 shows that a plurality of polarized array antennas is formed on a surface of a circuit chip, the plurality of polarized array antennas having orthogonal polarization directions.

FIG. 7 shows that a plurality of polarized array antennas having the orthogonal polarization directions is formed on a surface 700 of a circuit chip mounted on a wireless circuit substrate module (not shown in FIG. 7). Array antennas 701, 702, 703, . . . in FIG. 7 have linear polarization characteristics in the vertical direction of FIG. 7. Meanwhile, array antennas 711, 712, 713, . . . have linear polarization characteristics in the horizontal direction of FIG. 7. These array antennas 701, 702, 703, . . . are combined with the array antennas 711, 712, 713, . . . to configure the antenna unit 230, so that the reception characteristics can be substantially uniform in all the directions on the surface of the circuit chip. Needless to say, the antenna configuration illustrated in FIG. 7 can also be applied to the antenna unit 1650 of the transmission apparatus 120. Although the wireless processing unit 240 synthesizes the reception signals of the array antennas 701, 702, 703, . . . and the array antennas 711, 712, 713, . . . , the methods of antenna synthesis have been well known to those in the art. Accordingly, the detailed description will be herein omitted. When array antennas are formed as a wiring pattern not on the surface 700 of the circuit chip but the wireless circuit substrate module, the same configuration illustrated in FIG. 7 can also be used.

Figure 8:
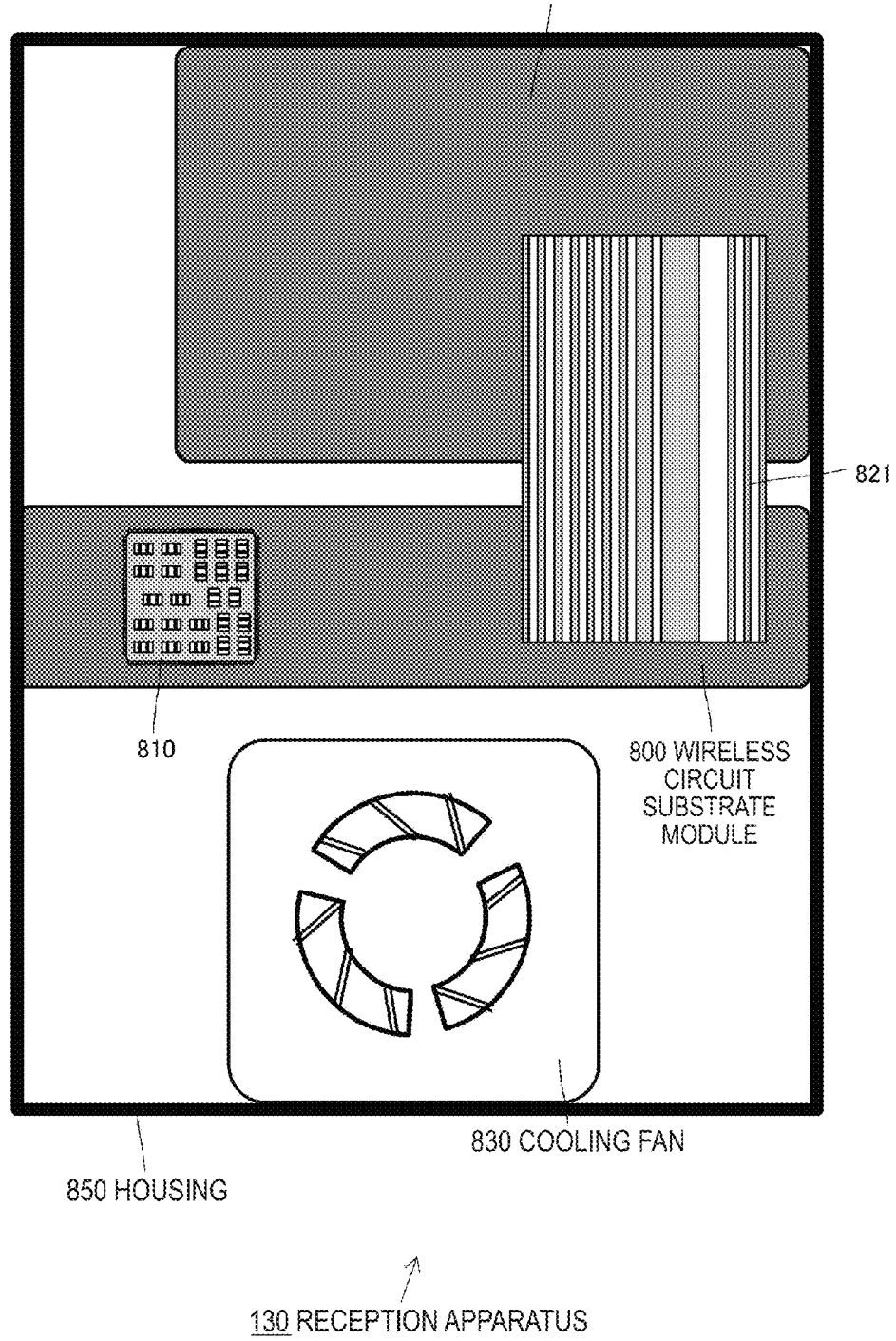
FIG. 8 shows that a wireless circuit substrate module 800 is installed in the reception apparatus 130.

FIG. 8 shows that a wireless circuit substrate module 800 is installed in the reception apparatus 130. The reception apparatus 130 also accommodates a main substrate 820, a cooling fan 830, and the like. For example, a flexible substrate 821 connects the main substrate 820 to the wireless circuit substrate module 800. A wireless circuit chip 810 is mounted on the wireless circuit substrate module 800, the wireless circuit chip 810 having the antenna unit 230 formed on the surface, the antenna unit 230 including a plurality of polarized array antennas having the orthogonal polarization directions. Although the main circuit substrate 820 has a large number of electronic parts mounted thereon and the wireless circuit substrate module 800 also has a plurality of circuit parts other than the wireless circuit chip 810 mounted thereon, they will not be relevant to the description. They are thus not shown.

Figure 3:
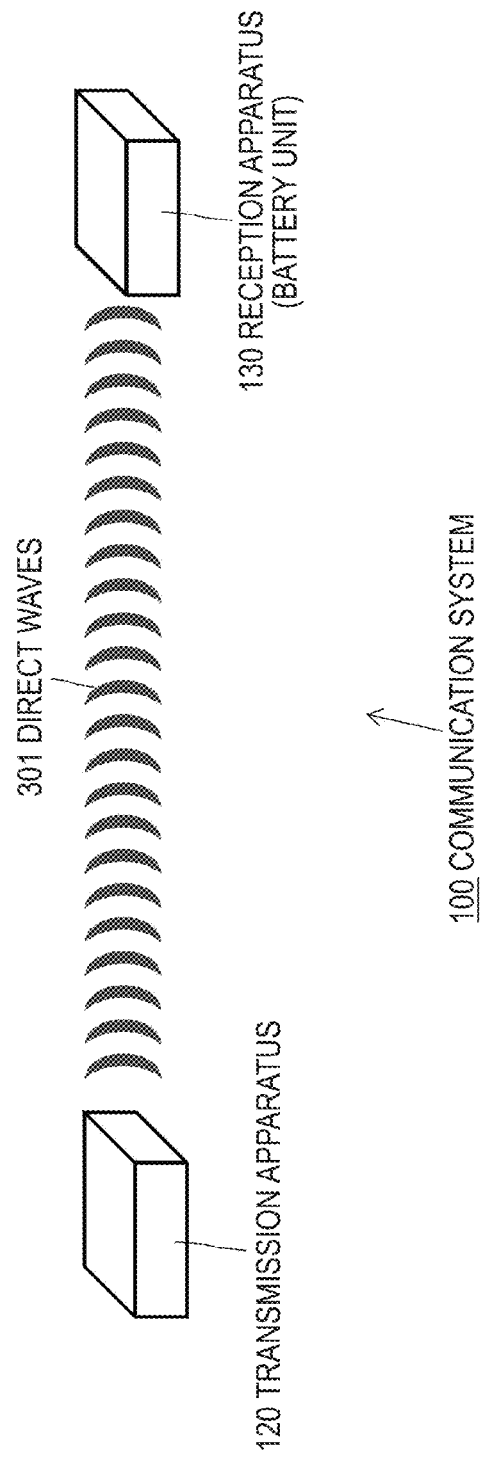
FIG. 3 shows that a direct wave of a wireless signal radiated from a transmission apparatus 120 reaches the reception apparatus 130.
Figure 14:
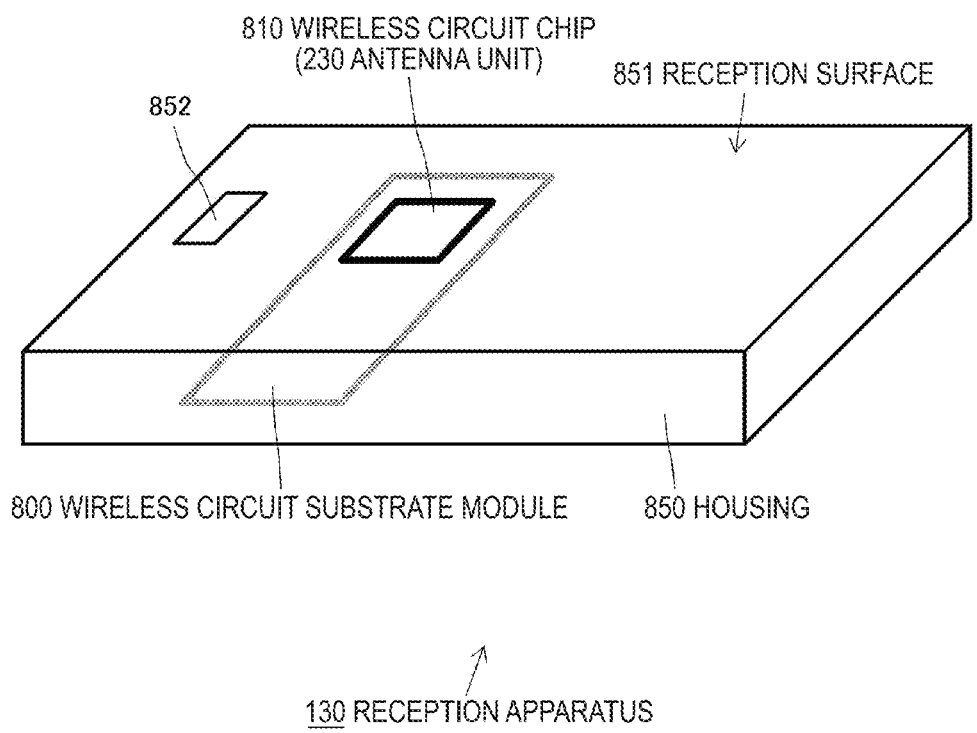
FIG. 14 is a perspective view showing the wireless circuit substrate module 800 is accommodated in a housing of the reception apparatus 130 in the horizontal placement state.

A housing 850 of the reception apparatus 130 illustrated in FIG. 8 is substantially cuboid. Cuboids are hexahedra whose surfaces are all rectangular and whose neighboring surfaces cross each other at 90 degrees (well known). When the cuboid is installed with the largest rectangular surface down as illustrated in FIGS. 3 and 4, the cuboid has the lowered center of gravity and is stable. Placing the reception apparatus 130 in this way will be herein referred to as "horizontal placement" state. FIG. 14 is a perspective view showing that the wireless circuit substrate module 800 is accommodated in the housing of the reception apparatus 130 in the horizontal placement state. The wireless circuit substrate module 800 and the wireless circuit chip 810 mounted thereon are parallel with the horizontal installation surface of the placement site (such as desks and tables) in the horizontal placement state. Thus, the antenna unit 230 formed on the surface of the wireless circuit chip 810 has substantially uniform reception characteristics with respect to the horizontal plane in the horizontal placement state.

When the housing 850 of the reception apparatus 130 is horizontally placed, the top face, to which the antenna unit 230 is pointed, has more satisfactory reception characteristics than the bottom face does. The top face of satisfactory sensitivity to the antenna unit 230 will be thus referred to as "reception surface" below. If a visual mark (discussed below) has been attached to the reception surface, a user uses the mark 852 as a clue and can more easily install the reception apparatus 130 in a posture in which satisfactory reception sensitivity is obtained. The mark 852 may also be, for example, a product logo mark. The transmission apparatus 120 may also have a mark (discussed below) such as logo marks attached to a side to which the directivity of the antenna unit 1650 is pointed or on which satisfactory transmission characteristics are obtained.

Figure 9:
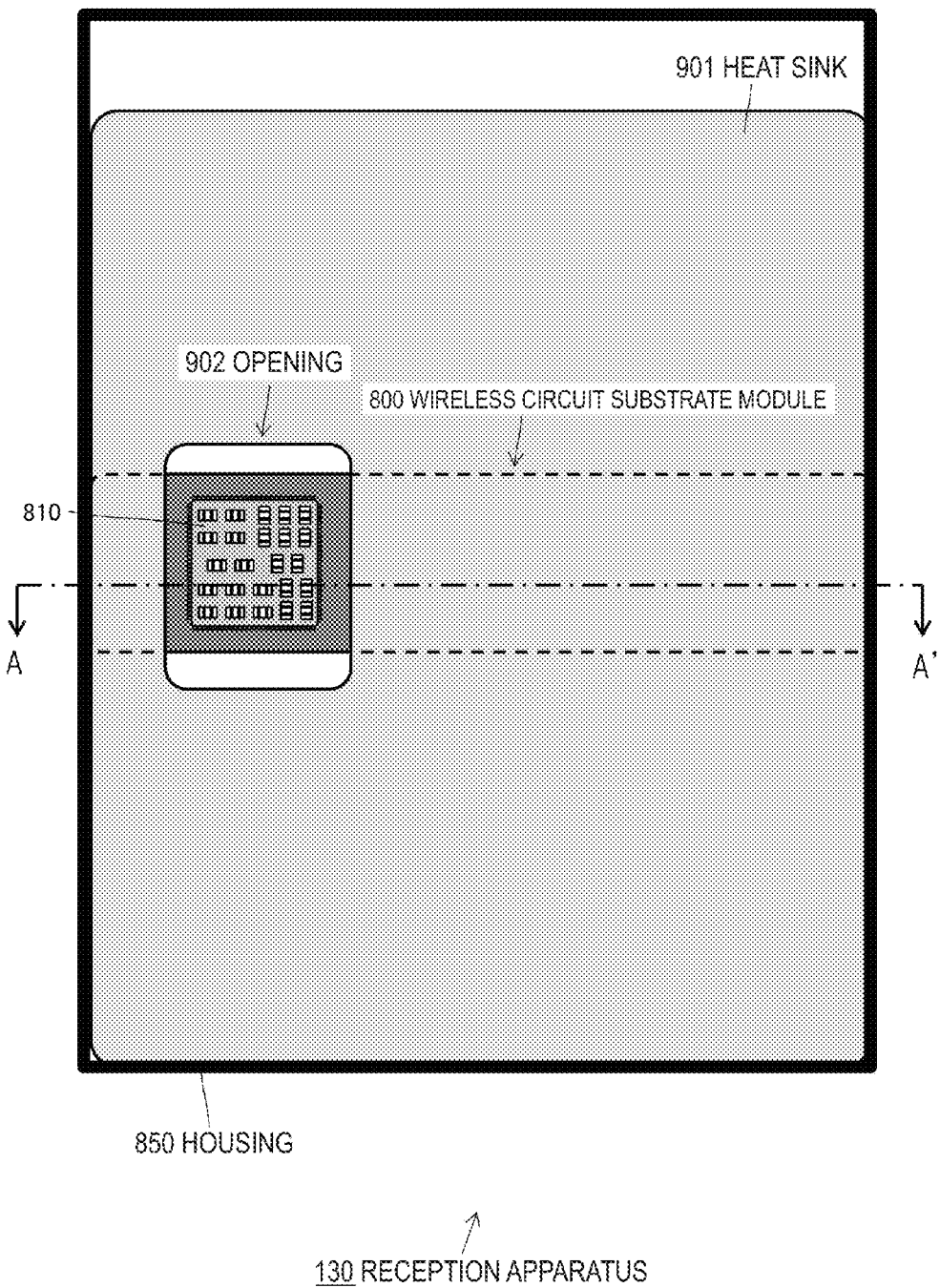
FIG. 9 shows that a heat sink 901 that also functions as an electromagnetic shield/case covers the wireless circuit substrate module 800.

Communication apparatuses have to comply with regulations such as Federal Communications Commission (FCC) regarding electromagnetic interference in various countries. Countermeasures against heat have to be taken for high frequency parts. FIG. 9 shows (FIG. 8 does not show) that the heat sink 901, which also functions as an electromagnetic shield/case, covers the surface of the wireless circuit substrate module 800. If the heat sink 901 fully covered the wireless circuit substrate module 800, it would not be possible to receive signals. An opening 902 is thus made above the wireless circuit chip 810 that has the antenna unit 230 formed on the surface, the antenna unit 230 including a plurality of polarized array antennas.

Figure 10:
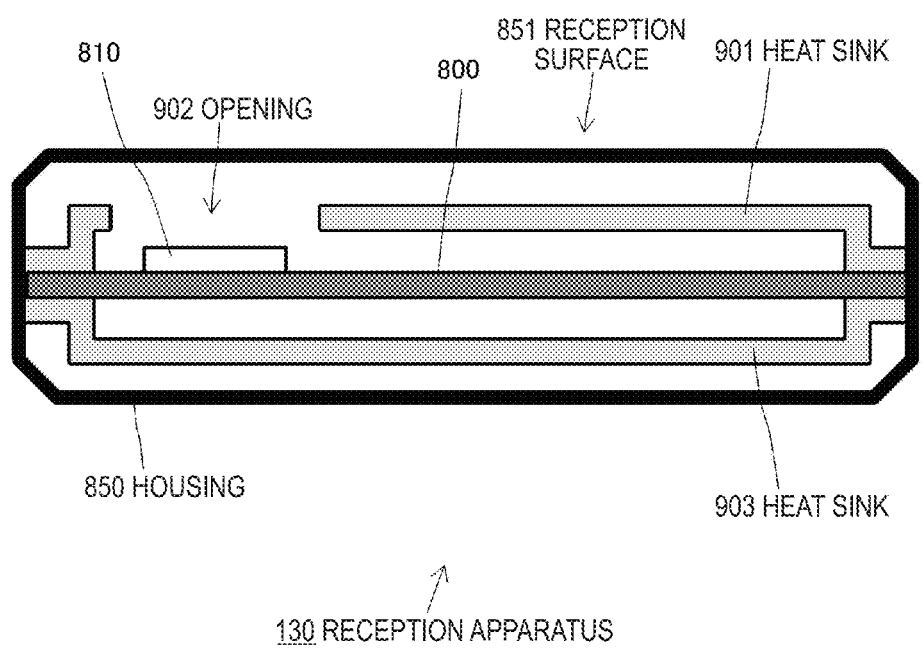
FIG. 10 is a cross-sectional view of the reception apparatus 130 taken along a line A-A' illustrated in FIG. 9.

FIG. 10 illustrates a cross-sectional view of the reception apparatus 130 taken along the line A-A' illustrated in FIG. 9. As also illustrated in FIG. 9, the heat sink 901, which also functions as an electromagnetic shield/case, covers the surface of the wireless circuit substrate module 800. Meanwhile, the back of the wireless circuit substrate module 800 is covered with another heat sink 903, which also functions as an electromagnetic shield/case. When the antenna configuration illustrated in FIG. 7 is applied to the antenna unit 1650 of the transmission apparatus 120, it is noted that the apparatus configurations as illustrated in FIGS. 8 to 10 are also applied to the transmission apparatus 120.

Figure 11:
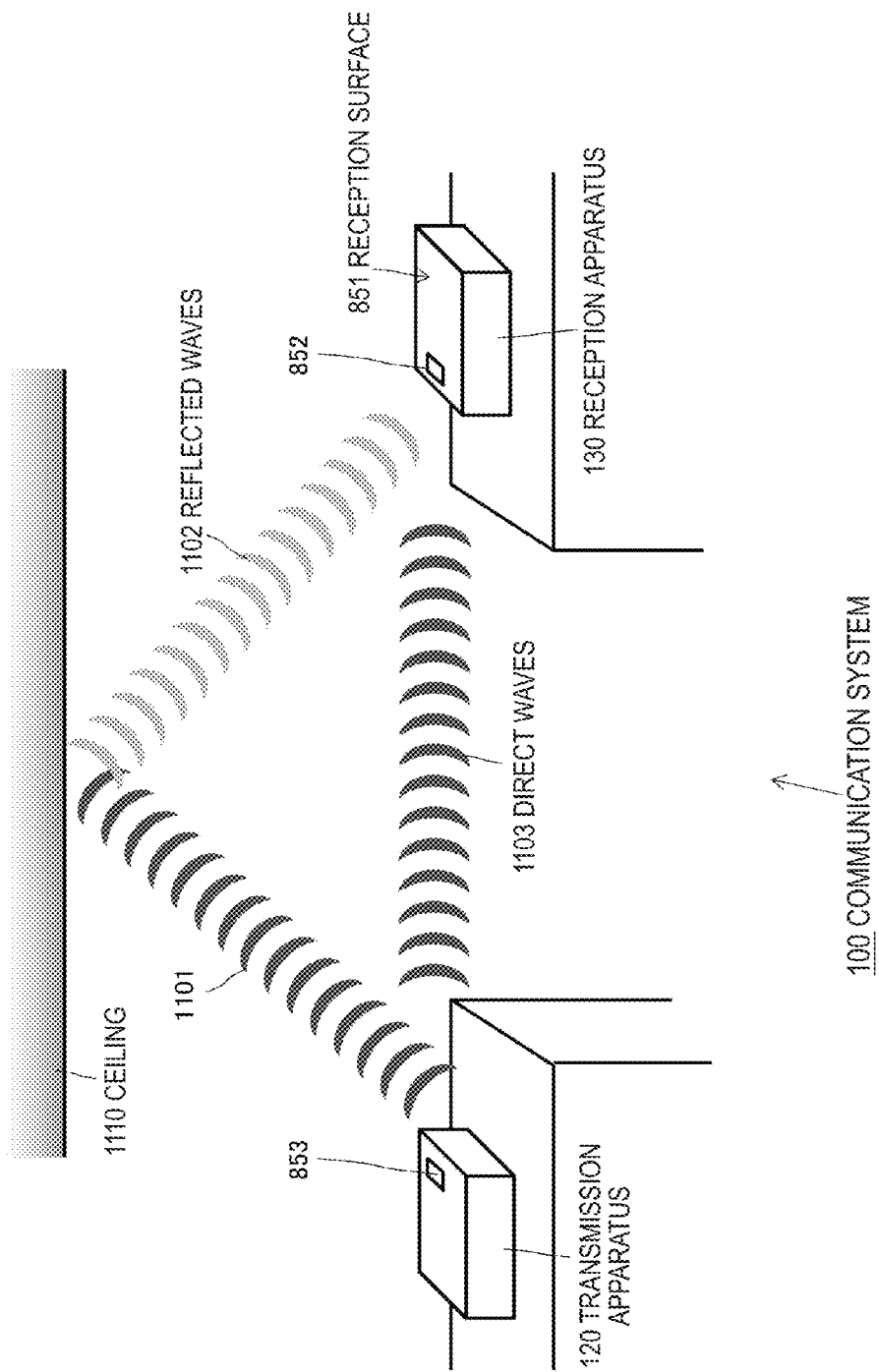
FIG. 11 shows that the reception apparatus 130 in a horizontal placement state receives a wireless signal from the transmission apparatus 120.

FIG. 11 shows that the reception apparatus 130 in the horizontal placement state receives a wireless signal from the transmission apparatus 120. The reception apparatus 130 is installed with the reception surface 851 facing upward in the illustrated example. A user uses the mark 852 as a clue and can definitely point the reception surface 851 upward. Likewise, the transmission apparatus 120 also has a mark 853 attached to a side to which the directivity of the antenna unit 1650 is pointed or on which satisfactory transmission characteristics are obtained. A user uses the mark 853 as a clue and can point the transmission surface upward (or in a desired direction).

Reflected waves 1102 that have been reflected off a ceiling 1110 arrive at the reception surface 851 of the housing 850 of the reception apparatus 130 along with direct waves 1103 of a wireless signal 1101 emitted from the transmission apparatus 120. The wireless signal 1101 is linearly polarized waves, but it is assumed that the reflected waves 1102 have the polarization plane or phase disturbed. As discussed above, the antenna unit 230 has substantially uniform reception characteristics with respect to the horizontal plane, so that the antenna unit 230 can stably keep receiving the reflected waves 1102 of the wireless signal 1101 of high directivity from the transmission apparatus 120.

The reception apparatus 130 is externally connected to the output apparatus 140 such as head mounted displays via the cable 141 (discussed above). The housing 850 of the reception apparatus 130 is pulled by the cable 141 and the direction of the housing 850 of the reception apparatus 130 in the horizontal placement state changes every time a user moves his or her body or a user changes his or her posture even while signals are being received (see FIG. 12). Since the antenna unit 230 maintains substantially uniform reception characteristics on the horizontal plane with respect to the reflected waves 1102 even in that case, the antenna unit 230 can stably keep receiving the wireless signal 1101 of high directivity from the transmission apparatus 120.

Figure 15:
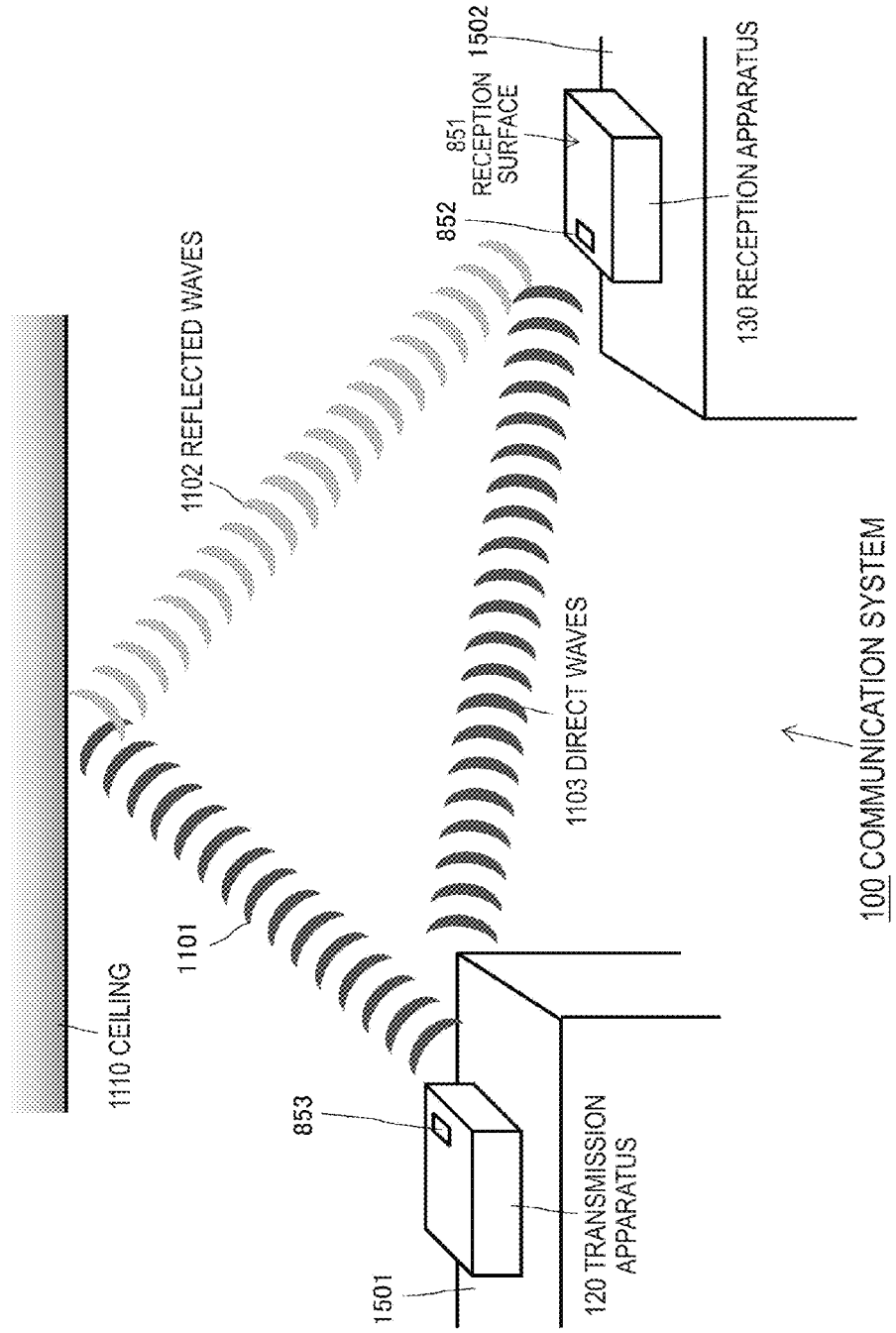
FIG. 15 shows that the reception apparatus 130 is horizontally placed on a lower site 1502 than an installation site 1501 of the transmission apparatus 120.

Needless to say, if the direct waves 1103 enter the antenna unit 230 at angles at which the antenna unit 230 has sensitivity, the antenna unit 230 can receive even the direct waves 1103, and the rotation of the reception apparatus 130 on the horizontal plane can offer the same reception characteristics. For example, when the reception apparatus 130 is horizontally placed on a lower installation site 1502 than an installation site 1501 of the transmission apparatus 120 as illustrated in FIG. 15, the rotation of the reception apparatus 130 on the horizontal plane can offer the same reception characteristics for the communication through not the reflected waves 1102 but the direct waves 1103.

Figure 13:
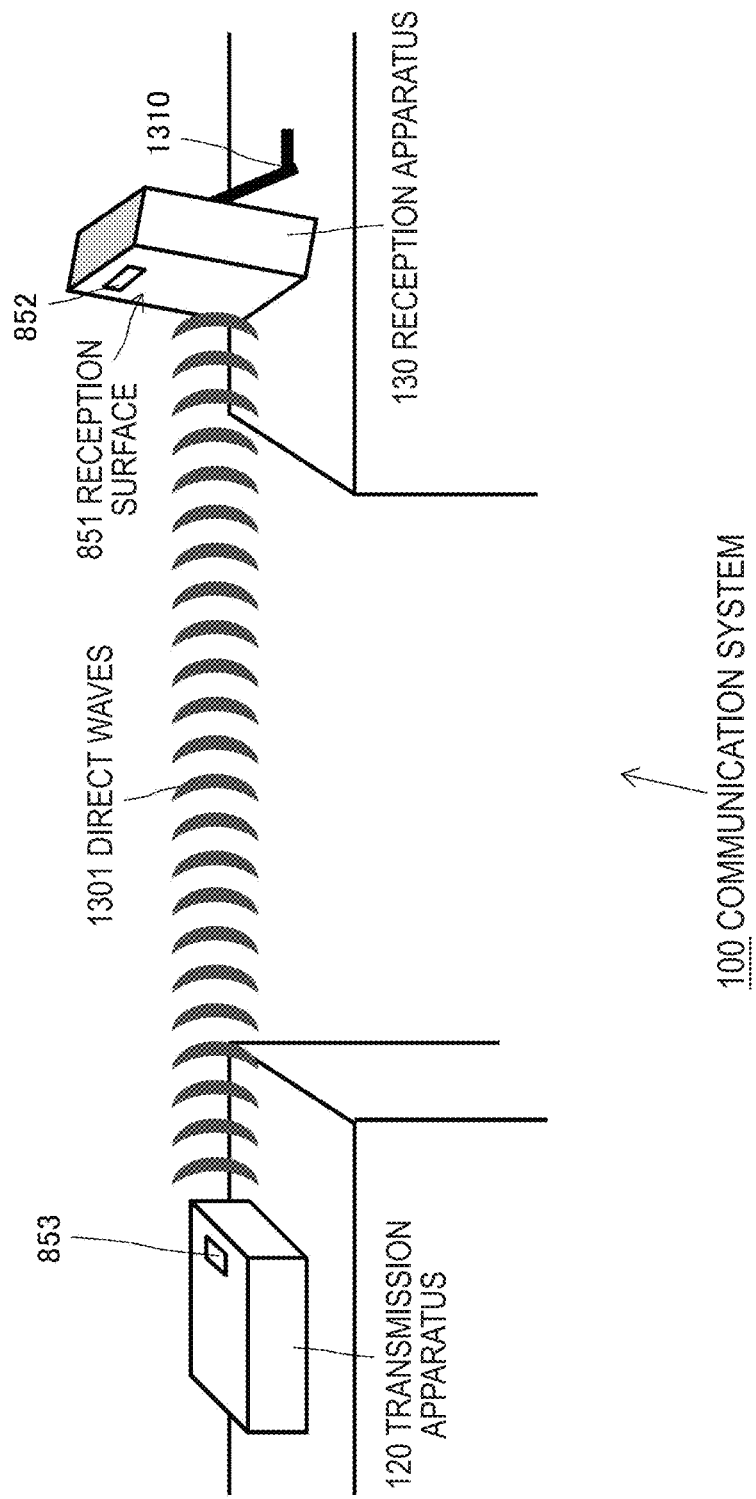
FIG. 13 shows that the reception apparatus 130 in a vertical placement state receives a wireless signal from the transmission apparatus 120.

FIG. 13 shows that the housing 850 of the reception apparatus 130 is brought into a "vertical placement" state with the second largest rectangular surface down, and the reception apparatus 130 receives a wireless signal from the transmission apparatus 120. For example, a stand 1310 supports the bottom of the housing 850 of the reception apparatus 130 (surface opposite to the reception surface 851), allowing the vertical placement state to be maintained.

The example illustrated in FIG. 13 shows that the reception apparatus 130 is installed such that the reception surface 851 faces the transmission apparatus 120. A user uses the mark 852 as a clue and can definitely point the reception surface 851 to the transmission apparatus 120. The transmission apparatus 120 also has the mark 853 attached to a side to which the directivity of the antenna unit 1650 is pointed or on which satisfactory transmission characteristics are obtained. A user uses the mark 853 as a clue and can point the transmission surface upward (or in a desired direction).

Direct waves 1301 of a wireless signal emitted from the transmission apparatus 120 arrive at the reception surface 851 of the housing 850 of the reception apparatus 130. Needless to say, it is assumed that the reflected waves (not shown) arrive together. As discussed above, since the antenna unit 230 has substantially uniform reception characteristics with respect to the horizontal plane, the antenna unit 230 can stably keep receiving the wireless signal 1101 of high directivity from the transmission apparatus 120.

Figure 12:
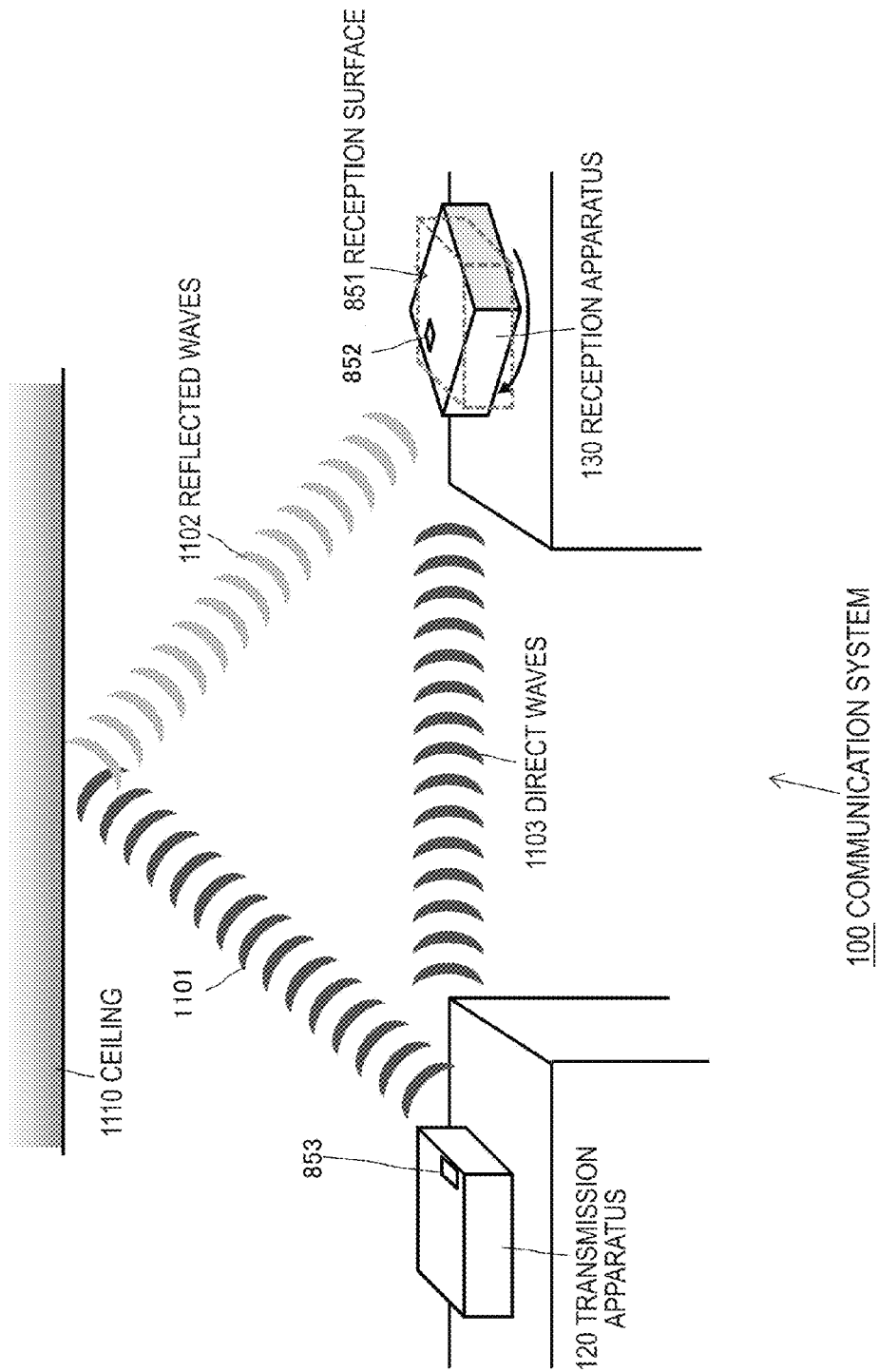
FIG. 12 shows that the reception apparatus 130 changes a direction in the horizontal placement state.

FIGS. 11 to 13 have shown the examples in which the position and direction of the reception apparatus 130 change. Configuring the antenna unit 230 of the reception apparatus 130 as illustrated in FIGS. 7 to 10 allows the direction of the reception apparatus 130 to be freely changed. Conversely, when the position and direction of the reception apparatus 130 are fixed and the transmission apparatus 120 is moved, the antenna unit 1650 of the transmission apparatus 120 may be configured as illustrated in FIGS. 7 to 10.

Figure 17:
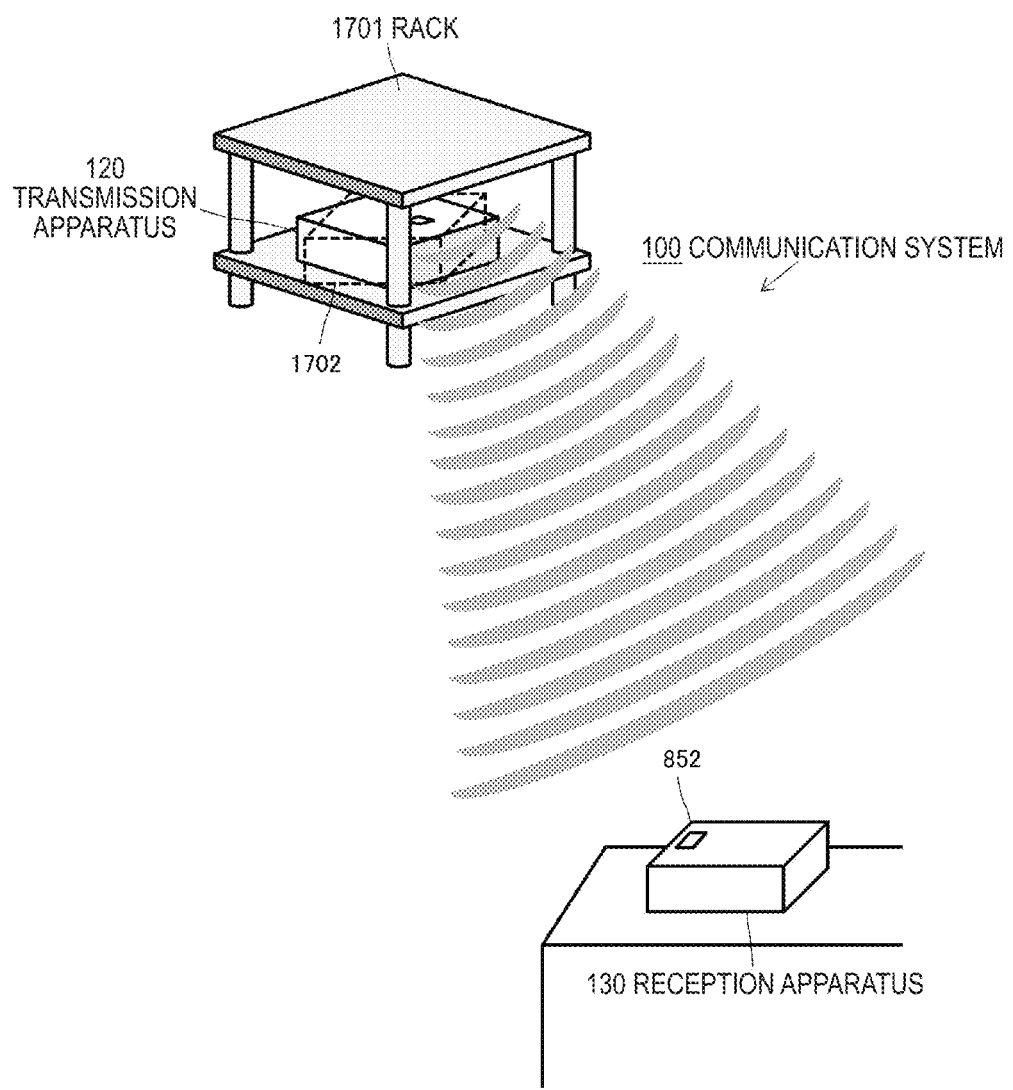
FIG. 17 shows that the reception apparatus 130 is not located right in front of the transmission apparatus 120 on a rack 1701.

For example, when the reception apparatus 130 is not located right in front of the transmission apparatus 120 on the rack 1701 as illustrated in FIG. 17, it is not possible to achieve satisfactory communication performance unless the transmission apparatus 120 is pointed to the reception apparatus 130 as indicated by a dashed line 1702. However, it is actually difficult to point the transmission apparatus 120 in the direction indicated by the dashed line 1702 because the beautiful appearance is spoiled if the transmission apparatus 120 is pointed in a direction other than the direction of the rack 1701.

In that case, if the antenna unit 1650 of the transmission apparatus 120 is configured to have transmission characteristics substantially uniform on the plane (see FIGS. 7 to 10) and the transmission apparatus 120 is horizontally placed, the reception apparatus 130 can achieve stable reception performance regardless of the installation direction. In other words, it becomes possible to install the transmission apparatus 120 in the direction matching with the rack 1701 without disadvantageously influencing the communication performance of the communication system 100.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present specification has primarily described embodiments in which the technology disclosed herein is applied to reception apparatuses that also function as externally attached apparatuses such as battery units for head mounted displays. The technology disclosed herein is not, however, limited thereto. The present specification has also primarily described embodiments in which the technology disclosed herein is applied to reception apparatuses that receive wireless signals based on the WirelessHD (registered trademark) standard. The technology disclosed herein is not, however, limited thereto. The technology disclosed herein can also be applied to a variety of reception apparatuses that receive wireless signals in a high frequency band or wireless signals of high directivity other than signals of WirelessHD (registered trademark).

In short, the present technology disclosed herein has been described with example embodiments. The description of the present specification is not limitative. The present technology disclosed herein should be understood with reference to the claims below.

Additionally, the present technology may also be configured as below.

(1) A communication apparatus including:
an antenna unit configured to transmit or receive a wireless signal; and
a wireless processing unit configured to process the wireless signal transmitted or received via the antenna unit,
wherein the antenna unit is configured or arranged to maintain a satisfactory communication characteristic regardless of arrangement and a direction with respect to an antenna of a communication partner apparatus that transmits or receives a wireless signal of high directivity.

(2) The communication apparatus according to (1),
wherein the antenna unit transmits or receives a wireless signal in a millimeter wave band.

(3) The communication apparatus according to (1),
wherein the antenna unit transmits or receives a wireless signal complying with a WirelessHD (registered trademark) standard.

(4) The communication apparatus according to (1), further including:
a housing configured to accommodate a circuit component in the communication apparatus including the antenna unit and the wireless processing unit,
wherein the antenna unit maintains a satisfactory communication characteristic with respect to a wireless signal regardless of arrangement and a direction of the housing.

(5) The communication apparatus according to (1),
wherein the communication apparatus is a reception apparatus that receives a wireless signal transmitted from a transmission apparatus, and
wherein the communication apparatus further includes a transfer unit configured to transfer a signal that has been processed by the wireless processing unit to an external apparatus.

(6) The communication apparatus according to (5),
wherein the transfer unit transfers a signal to the external apparatus via a cable.

(7) The communication apparatus according to (6),
wherein the transmission apparatus transmits data on a wireless signal, the data including an image,
wherein the external apparatus is an output apparatus that outputs the data including an image, and
wherein the communication apparatus is configured to be externally attached to the output apparatus.

(8) The communication apparatus according to (7),
wherein the output apparatus is a head mounted display that is worn by a user around a head, and
wherein the communication apparatus is configured as a battery unit for the head mounted display.

(9) The communication apparatus according to (1),
wherein the antenna unit has a uniform communication characteristic in substantially all directions on a plane.

(10) The communication apparatus according to (4),
wherein the antenna unit has a uniform communication characteristic in substantially all directions on a plane parallel with a particular surface of the housing.

(11) The communication apparatus according to (4),
wherein the housing is substantially cuboid, and
wherein, when the housing is horizontally placed with a largest surface down, the antenna unit has a uniform communication characteristic in substantially all directions on a horizontal plane.

(12) The communication apparatus according to (11),
wherein the housing has a visual mark attached to a communication surface on which the antenna unit has satisfactory communication sensitivity.

(13) The communication apparatus according to (1),
wherein the antenna unit includes a plurality of polarized array antennas installed on an identical plane, the plurality of polarized array antennas having orthogonal polarization directions.

(14) The communication apparatus according to (13),
wherein the respective polarized array antennas are configured as a conductor pattern on a wireless circuit substrate module including the wireless processing unit.

(15) The communication apparatus according to (14),
wherein the respective polarized array antennas are configured as a conductor pattern formed on a surface of a single circuit chip mounted on the wireless circuit substrate module.

(16) The communication apparatus according to (14), further including:
a shield/case configured to cover a surface of the wireless circuit substrate module.

(17) The communication apparatus according to (16),
wherein the shield/case also functions as a heat sink.

(18) The communication apparatus according to (16),
wherein the shield/case has an opening above the antenna unit.

(19) The communication apparatus according to (1),
wherein the communication apparatus is a transmission apparatus that transmits a wireless signal carrying reproduction data reproduced from a recording medium.

What is claimed is:
1. A communication apparatus comprising:
an antenna unit configured to transmit or receive a wireless signal; and
a wireless processing unit configured to process the wireless signal transmitted or received via the antenna unit, wherein the antenna unit is configured or arranged to maintain a satisfactory communication characteristic regardless of an arrangement and a direction with respect to an antenna of a communication partner apparatus that transmits or receives a wireless signal of high directivity, wherein the antenna unit includes a plurality of polarized array antennas installed on an identical plane, and wherein the respective polarized array antennas are configured as a conductor pattern on a wireless circuit substrate module including the wireless processing unit.

2. The communication apparatus according to claim 1, wherein the antenna unit is configured to transmit or receive a wireless signal in a millimeter wave band.

3. The communication apparatus according to claim 1, wherein the antenna unit is configured to transmit or receive a wireless signal complying with a WIRELESSHD™ standard.

4. The communication apparatus according to claim 1, further comprising:

a housing configured to accommodate a circuit component in the communication apparatus including the antenna unit and the wireless processing unit, and wherein the antenna unit is configured to maintain a satisfactory communication characteristic with respect to the wireless signal regardless of arrangement and a direction of the housing.

5. The communication apparatus according to claim 4, wherein the antenna unit has a uniform communication characteristic in substantially all directions on a plane parallel with a particular surface of the housing.

6. The communication apparatus according to claim 4, wherein the housing is substantially cuboid, and wherein in an event the housing is horizontally placed with a largest surface down, the antenna unit has a uniform communication characteristic in substantially all directions on a horizontal plane.

7. The communication apparatus according to claim 6, wherein the housing has a visual mark attached to a communication surface on which the antenna unit has a satisfactory communication sensitivity.

8. The communication apparatus according to claim 1, wherein the communication apparatus is a reception apparatus configured to receive the wireless signal transmitted from a transmission apparatus, and wherein the communication apparatus further includes a transfer unit configured to transfer the wireless signal that has been processed by the wireless processing unit to an external apparatus.

9. The communication apparatus according to claim 8, wherein the transfer unit is configured to transfer the wireless signal to the external apparatus via a cable.

10. The communication apparatus according to claim 9, wherein the transmission apparatus is configured to transmit data on the wireless signal, the data including an image, wherein the external apparatus is an output apparatus configured to output the data including the image, and wherein the communication apparatus is configured to be externally attached to the output apparatus.

11. The communication apparatus according to claim 10, wherein the output apparatus is a head mounted display that is worn by a user around a head, and wherein the communication apparatus is configured as a battery unit for the head mounted display.

12. The communication apparatus according to claim 1, wherein the antenna unit has a uniform communication characteristic in substantially all directions on a plane.

13. The communication apparatus according to claim 1, wherein the plurality of polarized array antennas have orthogonal polarization directions.

14. The communication apparatus according to claim 1, further comprising:

a shield/case configured to cover a surface of the wireless circuit substrate module.

15. The communication apparatus according to claim 14, wherein the shield/case also functions as a heat sink.

16. The communication apparatus according to claim 14, wherein the shield/case has an opening above the antenna unit.

17. The communication apparatus according to claim 1, wherein the communication apparatus is a transmission apparatus configured to transmit a wireless signal carrying reproduction data reproduced from a recording medium.

18. A communication apparatus comprising:

an antenna unit configured to transmit or receive a wireless signal; and a wireless processing unit configured to process the wireless signal transmitted or received via the antenna unit, wherein the communication apparatus include a housing configured to accommodate a circuit component in the communication apparatus including the antenna unit and the wireless processing unit, wherein the housing is substantially cuboid, and wherein the housing has a visual mark attached to a communication surface on which the antenna unit has a satisfactory communication sensitivity.

19. A communication apparatus comprising:

an antenna unit configured to transmit or receive a wireless signal; and a wireless processing unit configured to process the wireless signal transmitted or received via the antenna unit, wherein the antenna unit is configured to maintain a satisfactory communication characteristic regardless of an arrangement and a direction with respect to an antenna of a communication partner apparatus that transmits or receives a wireless signal of high directivity, wherein the antenna unit may include a plurality of polarized array antennas installed on an identical plane, and wherein the plurality of polarized array antennas have orthogonal polarization directions.

20. The communication apparatus according to claim 7, wherein the respective polarized array antennas are configured as a conductor pattern formed on a surface of a single circuit chip mounted on the wireless circuit substrate module.

* * * * *